Figure 1:
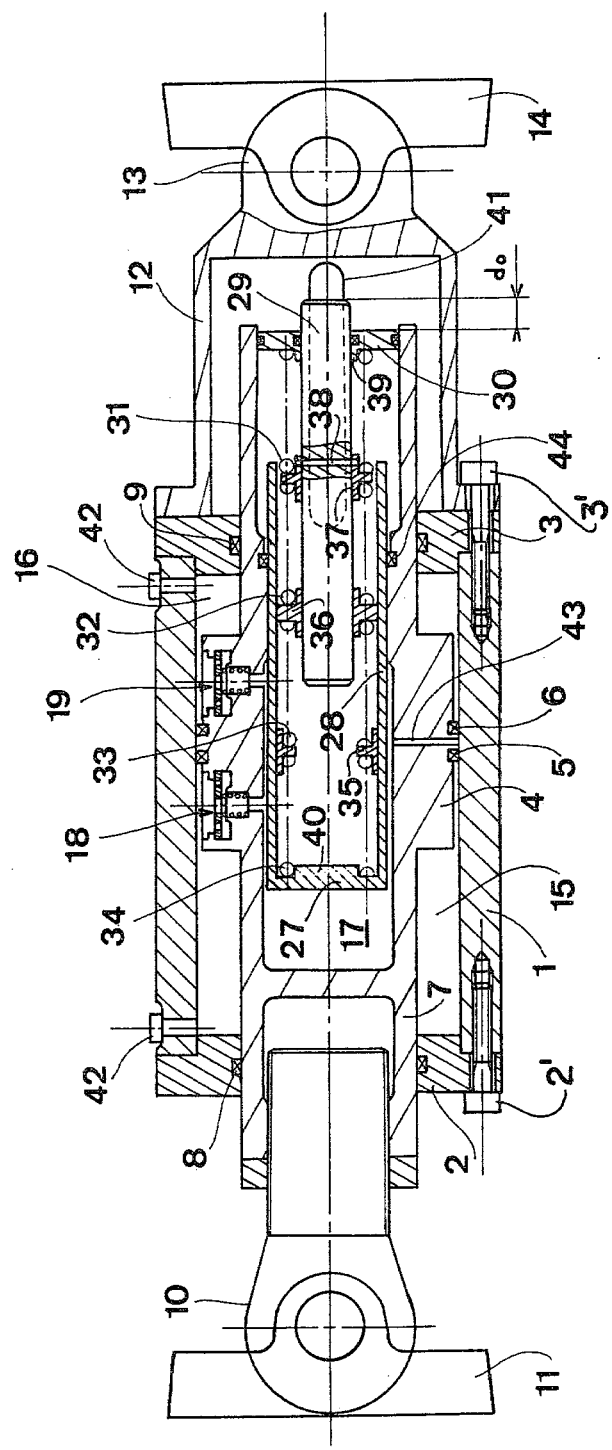

United States Patent [19]

Masclet et al.

[11] 4,312,429
[45] Jan. 26, 1982

[54] HYDRAULIC BRAKING DEVICE FOR A LOAD SUBJECTED TO SHOCKS AND VIBRATIONS

[75] Inventors: Jean Masclet, Paris; André Turiot, Morsang sur Orge, both of France

[73] Assignee: Messier-Hispano-Bugatti, Montrouge, France

[21] Appl. No.: 107,876

[22] Filed: Apr. 2, 1980

[30] Foreign Application Priority Data

Dec. 29, 1978 [FR] France .................. 78 36808

[51] Int. Cl.³ .................................. F16F 9/49
[52] U.S. Cl. .................................. 188/315; 188/280
[58] Field of Search ........... 188/286, 284, 315, 280, 188/322, 314, 312, 317; 267/65 R, 8 R; 213/43

[56] References Cited

U.S. PATENT DOCUMENTS

| | | | |
|---|---|---|---|
| 2,260,634 | 10/1941 | Mullner | 188/282 |
| 2,630,193 | 3/1953 | Funkhouser | 188/312 |
| 3,991,659 | 11/1976 | Robinson | 188/280 |

Primary Examiner—Bernard Nozick
Attorney, Agent, or Firm—McAulay, Fields, Fisher, Goldstein & Nissen

[57] ABSTRACT

A hydraulic braking device for a load subjected to shocks and vibrations for the stabilization of loads in thermal or nuclear generating stations.

The braking device has a cylinder 1 in which there slides the piston 4 of a rod 7 bearing two flap valves 18 and 19 to brake the passage at high speed of hydraulic fluid from one chamber 15 or 16 to the other. These valves communicate with a reservoir 17, pressurized by springs 31 to 34 and accumulate the expansions of the fluid. A secondary rod 29 which has displacements with respect to rod 7 which are reduced relative to the displacement of piston of reservoir 27 with respect to this rod 7 serves as a leak indicator.

Application to the stabilization of loads such as high-temperature steam conduits in thermal or nuclear generating stations.

6 Claims, 5 Drawing Figures

HYDRAULIC BRAKING DEVICE FOR A LOAD SUBJECTED TO SHOCKS AND VIBRATIONS

The subject of the present invention is a hydraulic braking device for a load subject to shocks and vibrations.

It is known that in installations involving suspended loads of any kind, such as pipelines, in which fluids at high temperature circulate, as is the case, for example, in power generating stations, for piping steam, these loads must be suspended or articulated on works of civil engineering to permit slow deformations, for example of a thermal origin, of these loads or of elements adjacent to them. Furthermore it is necessary to stablize these loads dynamically, in order to protect both them and their adjacent elements, in the event of an explosion, a rupture of elements, even an earthquake.

For this purpose, devices have already been developed, which were to be inserted between a suspended or articulated load and a solid support, and which can expand or contract, opposing very slight force in the event of slow movements, due for example to thermal expansions or deformations of the load or of elements adjacent to the load, and opposing considerable force in the event of sudden outside stresses that may be of an alternating nature, in order to stabilize the load dynamically.

Hydraulic devices of this type, are already known. Said devices comprise a cylinder capable of being integrated with one of the elements constituting the load and the support, and traversed in a leakproof fashion by a main slide rod capable of being integrated with other of the elements, the load or support, and whereof the part inside the cylinder exhibits a superthickness shaped as a main piston, sliding in leakproof fashion in the cylinder and defining, with the latter, two chambers filled with hydraulic fluid, that can circulate from one of the two chambers to the other through two flap valves which do not brake the low-speed circulation of the fluid, and whereof one or the other, depending on the direction of displacement of the main rod in the cylinder, insures the braking of the circulation of the fluid, by throttling the latter to limit the rate of displacement of the rod in the cylinder, under the influence of abnormally strong forces on the load, and oppose a blocking reaction to displacements developing as a result of substantial accelerations following shocks or vibrations.

These hydraulic braking devices, of the double-action, telescoping type, have a substantial drawback related to the possibility of non-negligeable hydraulic leaks, on the one hand in view of the use in these devices of a plurality of dynamic gaskets, and on the other hand, in view of the effects of the environment of the device on these gaskets, particularly within the scope of application in nuclear generating stations, where the gaskets are brought to elevated temperatures, and are exposed to radiation. As a result, these known braking devices have to be accompanied by external equipment intended to compensate for leaks, which must be detected beforehand. Likewise, it will be advisable to provide an accumulator of expansions of the hydraulic fluid in the braking device, which, while in operation, is made to undergo substantial variations in temperature.

It is proposed, by means of the present invention, to remedy these drawbacks by incorporating, in a hydraulic braking device, means permitting automatic compensation of leaks, and the accumulation of expansions of the hydraulic fluid as well as means indicating whether leaks have occurred.

For this purpose, the hydraulic braking device according to the invention is characterized in that the main rod is hollow and contains a reservoir for hydraulic fluid communicating with each of the chambers of the cylinder through one of the flap valves, which are disposed in the superthickness of the main rod, a secondary piston, mounted to slide in the main rod, and urged by elastic means pressing against the main rod, insuring the pressurization of the reservoir, which at the same time constitutes an accumulator for the expansions of hydraulic fluid. As a result, any hydraulic leak at the level of the chambers in the cylinder is compensated by a feed of hydraulic fluid from the reservoir, under the influence of the secondary piston urged by the elastic means. Inversely, any expansion of the hydraulic fluid occasions a transfer of fluid toward the reservoir, repelling the secondary piston against the elastic means.

Furthermore, the secondary piston is borne at the end of a sleeve which slides in a leakproof fashion in the main rod, and in which a secondary rod is mounted to slide, urged by the elastic means, and likewise capable of sliding in the main rod, thereby providing a means that indicate the state of filling of the pressurized reservoir when the position of the secondary rod relative to the main rod is observed.

Preferably, the elastic means are constituted by a plurality of springs, mounted end to end and connected together by means of sliding pieces, at least one of which slides inside the sleeve, and at least one other of which slides around the secondary rod, the latter or one of the latter being integral with the secondary rod whose displacements with respect to the main rod are reduced in comparison with the displacements of the secondary piston with respect to the main rod. As a result, the secondary piston may be enabled to execute a long stroke inside the main rod, while the stroke of the secondary rod is limited to a small value, with respect to the main rod, which does not require an increase in the total length of the device, the more so as the secondary rod then, as a result of the mounting of the springs, can retract into the main rod.

The invention will be better understood with the aid of a particular example of embodiment which will now be described, in non-limiting fashion, with reference to the attached figures in which:

FIG. 1 represents, in axial section, a hydraulic braking device in the position which it occupies between a support and an element of fluid conduit in a thermal or nuclear generating station, which is inactive, the ambient temperature being about 20° C. and the device being free of any hydraulic leak.

Figure 2:
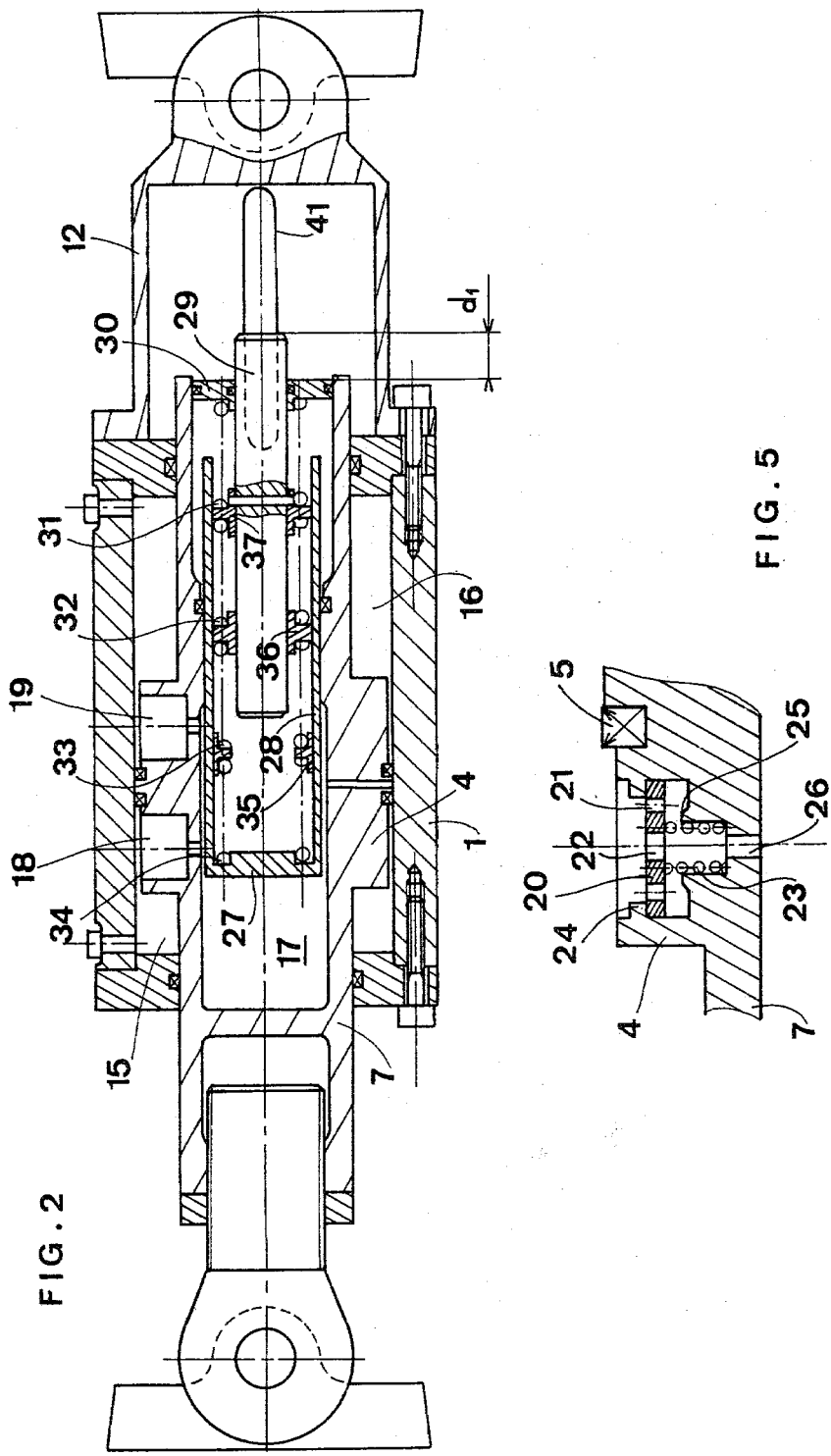

FIG. 2 represents, in analogous fashion, the device according to FIG. 1, in the position which it occupies under normal running conditions, the station being active, the ambient temperature being 50° to 80° C. approximately owing to the circulation of steam at high temperature in the conduit element which has consequently expanded and been displaced under the influence of the expansion of other downstream or upstream elements of the conduit, perpendicular to the element in question, and with no leaks in the device.

Figure 3:
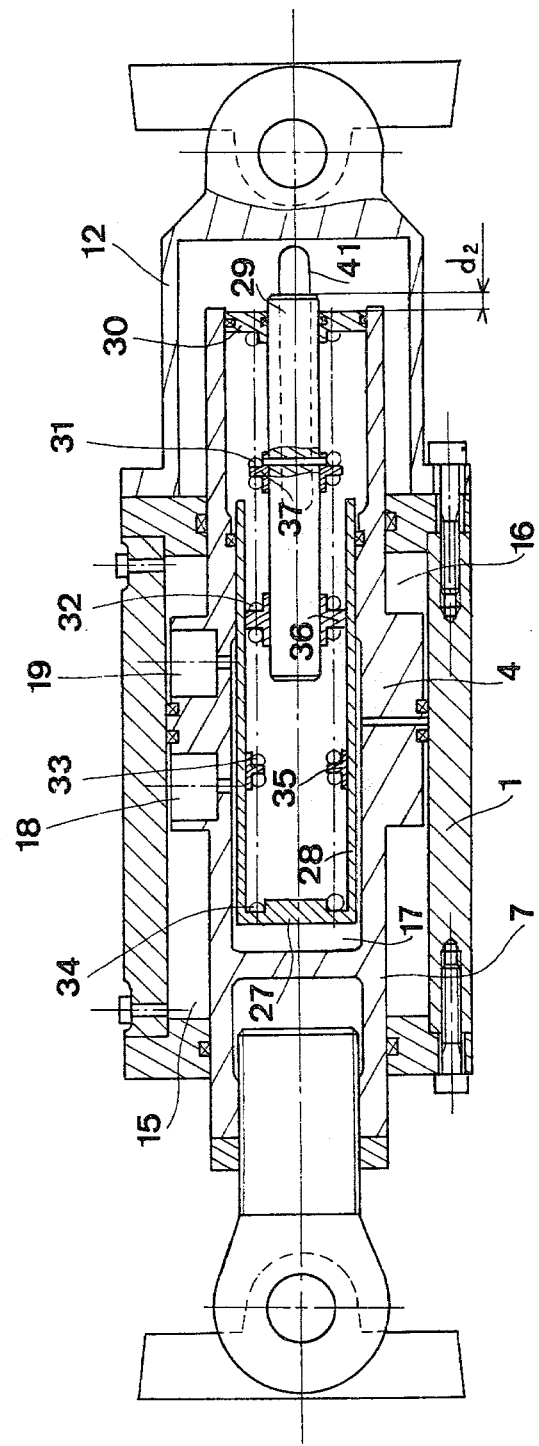

FIG. 3 represents in analogous fashion, the device according to FIGS. 1 and 2, the station having been shut down, the ambient temperature having returned to about 20° C., but hydraulic fluid leaks have appeared.

Figure 4:
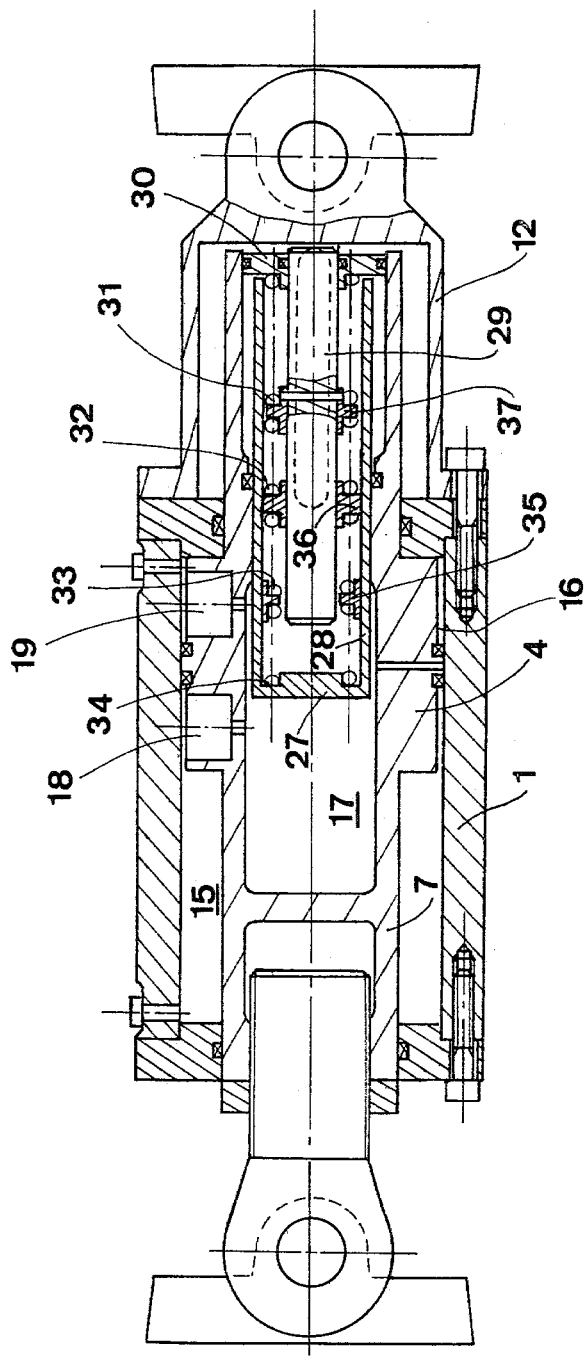

FIG. 4 represents in analogous fashion, the device according to FIGS. 1 to 3, in the position which it occupies following an accident such as a rupture of a conduit, the ambient temperature being on the order of 150° to 300° C. owing to the release of fluid at a high temperature circulating in the broken conduit. And finally, FIG. 5 represents, on a different scale, a sectional view of one of the two flap valves equipping the device according to FIGS. 1 to 4.

With reference to FIGS. 1 to 4, the hydraulic braking device comprises a cylinder 1, closed at both ends by bases 2 and 3 held to cylinder 1 by screw connectors 2' and 3', and in which a main piston 4 is mounted to slide in a leakproof fashion, owing to two lipped gaskets 5 and 6 borne on the perimeter of piston 4, which is constituted by a superthickness of a main rod 7, passing through the bases 2 and 3 in leakproof fashion owing to gaskets 8 and 9, and whereof the central part, presenting and surrounding the superthickness shaped into a main piston 4, is capable of sliding in cylinder 1, while in one end of rod shaft 7, the end of rod shaft 7 has a bore, and there is screwed within the bore an attachment 10 for articulation of the device onto a sole 11 integral with the steam conduit element, and the other end of main rod 7 is surrounded by a protective jacket 12, held at one end thereof by screw 3', screwed onto base 3 and cylinder 1, and whose other end is shaped as an attachment 13 for articulation of the device to a sole 14 integral with the support, constituted, for example by a piece of structure or civil engineering such as a wall or a partition.

The main piston 4 and the main rod 7 define, with cylinder 1, two chambers 15 and 16 for hydraulic fluid, of the same working section each of which communicates with a chamber 17 inside main rod 7, which is hollow, by means of one of two flap valves 18 and 19, installed in the superthickness or a wider portion of main rod 7 which is shaped as a main piston 4, on either side of two lipped gaskets 5 and 6. Valves 18 and 19 are identical and, as seen in FIG. 5, each one has a flap 20 in the form of a disc pierced, on the one hand with a plurality of orifices 21 regularly spaced on its perimeter, and on the other hand, with a central orifice 22.

A spring 23 applies flap 20 against an annular stop 24, formed on the perimeter of a bore debouching in one of the chambers 15 or 16, and the displacements of the flap against spring 23 are limited by a seat 25, constituted in the form of a central annular stop surrounding a well accommodating spring 23 and debouching or opening, through hole 26, into chamber 17. These valves 18 and 19 are of a well-known type, remaining in open position, that is to say with flap 20 applied by spring 23 against stop 24, when the valve is not traversed by moving hydraulic fluid, when the hydraulic fluid passes through the valve, coming from internal chamber 17, whatever its rate of circulation, since it can freely flow through orifices 21 and the central orifice 22, and finally, when the hydraulic fluid flows off at a low speed toward chamber 17, while the valves go into closed position, i.e. with flap 20 applied, against spring 23, against stop 25, when the hydraulic fluid is urged to flow at a high speed toward chamber 17. In their closed position, valves 18 and 19 introduce a braking of the circulation of the hydraulic fluid by throttling the latter through the central orifice 22. Owing to the mounting of valves 18 and 19 in piston 4, symmetrically on either side of gaskets 5 and 6, the hydraulic fluid can flow freely from one to the other of the two chambers 15 and 16 of cylinder 1, passing through one of the valves 18 and 19, chamber 17, then the other valve, without closing either of the two valves 18 and 19, for any slow displacement of main rod 7, and hence of main piston 4, into cylinder 1. But one or the other of the valves 18 and 19, depending on the direction of the displacement of main rod 4 in cylinder 1, closes and insures the braking of the circulation of hydraulic fluid by throttling the latter through the central orifice 22 of its flap 20, in order to limit the rate of displacement of main rod 7 in cylinder 1, when abnormally high forces develop on the conduit element connected to the rod 7 and tend to move this conduit element toward or away from the support at high speed, and in order to oppose a blocking reaction to the displacements of rod 7 developing under the influence of substantial accelerations, following shocks or vibrations to which the conduit element is exposed. Chamber 17, inside main rod 7, through which the hydraulic fluid travels when circulating from one to the other of the two chambers 15 and 16 of cylinder 1, is delimited by a secondary piston 27, borne at the end of a sleeve 28, mounted to slide in leakproof fashion inside main rod 7, by means of a gasket 44. In addition, a secondary rod 29 is mounted to slide at the same time in sleeve 28 and to slide in main rod 7, whose end is surrounded by protective jacket 12 and is closed by a base 30, through which secondary rod 29 passes. Four compression springs 31, 32, 33, 34, are mounted end to end in series, between base 30 of main rod 7 and piston 27 of sleeve 28, to insure the pressurization of the hydraulic fluid contained in chamber 17, which constitutes a pressurized reservoir of hydraulic fluid for chambers 15 and 16 of cylinder 1, making it possible to feed the latter, under the influence of piston 27 urged by the springs, to compensate for losses of hydraulic fluid due to leaks that may occur at gaskets 8 and 9. At the same time, the pressurized reservoir thus embodied constitutes an accumulator of the expansions of hydraulic fluid contained in the device. As a matter of fact, the increase in the volume of this fluid, following an increase in the ambient temperature, causes the displacement of piston 27 and sleeve 28 against springs 31, 32, 33 and 34. Springs 33 and 34 cooperate with one another by means of a sliding piece 35, mounted to slide with its base inside sleeve 28, while springs 32 and 33 cooperate with one another by means of a sliding piece 36, mounted to slide with its base around the secondary rod 29, and with its head inside sleeve 28, so that it guides secondary rod 29 in its displacements with respect to sleeve 28, and springs 31 and 32 cooperate by means of a sliding piece 37 fixed on secondary rod 29 by a pin 38, spring 31 likewise being positioned against the base 30 by means of an annular crown 39, integral with base 30, traversed by secondary rod 29, while spring 34 is positioned against piston 27 around a disc 40 integral with this piston 27. Any displacement of secondary piston 27, or sleeve 28, with respect to the main rod 7, indicating a variation in the state of filling of chamber 17, gives rise, with a "reduction", to a corresponding displacement of secondary rod 29 with respect to main rod 7, or of base 30 of the latter, owing to the mounting of springs 31 to 34. If these springs 31 to 34 are identical, a reduction ratio of four is obtained, the displacement of secondary rod 29 with respect to the main rod 7 being four times smaller than the displacement of piston 27 with respect to main rod 7, owing to the fact that the displacement of secondary rod 29 corresponds only to the variation in length of spring 31, while the displacement of piston 27 corresponds to the sum of the variations in length of springs 31, 32, 33 and 34, which are identical. Axial ports such as 41 are formed in protective jacket 12, and a calibration as a function of the stroke of main rod 7 in cylinder 1, as well as a function of the stroke of secondary piston 27 in main rod 7, owing to expansions of the hydraulic fluid due to temperature variations, is represented on the one hand by graduations formed along an axial edge of ports 41, and on the other hand by a chart indicating the extent to which the end of secondary rod 29 must emerge from base 30 of the main rod 7 at a given ambient temperature. It will then be easy for an observer when making a check to note, from the outside of the device, whether main rod 7 and piston 4 are abutting inside cylinder 1 when the operation of the station is shut down, which would provide no braking stroke while the station is in operation, and if the device showed evidence of hydraulic leaks. In the latter case, it would be possible to recharge the device with hydraulic fluid using filler valves 42.

And finally, a hole 43, made in the main piston 4, debouching on the one hand into chamber 17 and on the other hand against cylinder 1 between lipped gaskets 5 and 6, makes it possible to balance the pressures on either side of gaskets 5 and 6.

The device whose structure has just been described, works in the following manner, starting with the configuration of the device represented in FIG. 1, for which the ambient temperature is 20° C., in an inactive generating station, the device showing no evidence of leaks. This is shown by the fact that rod 7 is three quarters of a stroke into cylinder 1, and the end of rod 29 is at a certain distance $d_o$, out of the base 30 of rod 7. And, if the station has been started up, so that the ambient temperature is established at 60° C., then the conduit element fixed to rod 7 will be distant from the support fixed to the cylinder 1, as a result of the expansion of adjacent conduit elements, perpendicular to the element in question, so that the device will adopt the configuration according to FIG. 2, rod 7 being only one quarter of a stroke into the cylinder, the emergence of the rod 7 occurring without hydraulic braking, owing to the slow displacements resulting from the gradual ride in ambient temperature, and the expansions of the hydraulic fluid being absorbed by the pressurized reservoir, whose piston 27 is repelled against springs 31 to 34 on a stroke $C_1$, the end of the rod 29 outside of rod 7 being at a distance $d_1$ from base 30 such that $d_1-d_0=C_1/4$.

When the operation of the station has been stopped, and the ambient temperature has returned to 20° C., a check can be made. An examination through ports 41 of the positions occupied by rod 7 and by the end of rod 29, reveals by a reading of the graduations on the edges of ports 41 that rod 7 is again three quarters of a stroke into cylinder 1 (cf. FIG. 3), but that the end of rod 29 outside of rod 7 is only at a distance $d_2$ (should read "d2"-tr.) from base 30, which corresponds to a temperature of 20° C. This distance $d_2$ is less than $d_0$ which shows that piston 27 has moved inside rod 7 by a stroke $C_2$, such that $C_2=4(d_0-d_2)$, under the influence of springs 31 to 34, to compensate for leaks occurring while the station was in operation, and which in the figures, amount to two thirds of the original reserve capacity.

When the device has been recharged with hydraulic fluid through valves 41, until the end of rod 29 outside of rod 7 is again at a distance d from the base 30, corresponding to the charge to the ambient temperature of the moment, for example $d_1$ if the temperature is 20° C. as shown in FIG. 1, the station can be started up again, and the device will resume the position which it occupies in FIG. 2. From this position, if an adjacent conduit element were to break, and develop abnormally high forces tending to bring the conduit element borne by rod 7 toward the support bearing cylinder 1 at a high velocity, a hydraulic breaking is obtained that limits the velocity of this displacement by closing valve 19 to throttle the hydraulic fluid passing from chamber 16 to chamber 17, until piston 4 is in abutment in cylinder 1. At the same time, the ambient temperature rises to a temperature in the range of 200° C. under the influence of the high-temperature fluid escaping from the broken conduit. The resulting expansions of hydraulic fluid are absorbed by the displacement of piston 27 against springs 31 to 34, sleeve 28 coming practically against the base 30, but rod 29, whose end is situated outside of rod 7 presses against the base of jacket 12, will be almost completely lodged in sleeve 28, without interfering with the displacements of rod 7 or of sleeve 28.

The device according to the invention thus has the advantage of the provision of its own reserve of hydraulic fluid to compensate for losses, the power of accumulating expansions of thermal origin of this fluid, and the provision of a leak indicator whose presence involves no extension inherent in the device itself.

The hydraulic braking device according to the invention will advantageously be used whenever there is need for dynamic stabilization of a load subjected to shocks and vibrations in a medium where the ambient temperature is susceptible to wide variations.

We claim:

1. Hydraulic braking apparatus for a load subject to shocks and vibrations, which is is installed between the load and a support, and is integrated with one of the elements constituted by the load and the support by a cylinder traversed in leakproof fashion by a main slide rod, which is integrated with the other of the elements, the load or the support, and whose part inside the cylinder has a super-thickness shaped as a main piston, sliding in leakproof fashion in the cylinder and defining with the latter two chambers filled with a hydraulic fluid that passes from one to the other of the two chambers through two flap valves which do not brake the circulation of the fluid at low speed, and one or the other of which, depending on the direction of displacement of the main rod in the cylinder insures the braking of the circulation of the fluid by throttling the latter to limit the rate of displacement of the rod in the cylinder under the influence of abnormally high forces on the load, and oppose a blocking reaction to the displacements developing under the influence of substantial accelerations as the result of shocks or vibrations, wherein the main rod is hollow and contains a reservoir of hydraulic fluid that communicates with each of the chambers in the cylinder through one of the flap valves, which are disposed in the superthickness of the main rod, a secondary piston mounted to slide in the main rod and urged by elastic means pressing against the main rod for insuring the pressurization of the reservoir which at the same time constitutes an accumulator of expansions of the hydraulic fluid.

2. Apparatus according to claim 1, wherein the secondary piston is borne at the end of a sleeve and slides in leakproof fashion in the main rod, and in which a secondary rod is mounted to slide and is urged by the elastic means, likewise capable of sliding in the main rod, and whereof the position with respect to the latter provides an indication of the state of filling of the pressurized reservoir.

3. Apparatus according to claim 2, wherein the elastic means are constituted by a plurality of springs mounted end to end and connected together by means of sliding pieces, at least one of said pieces slides in the interior of the sleeve, at least one other of which slides around the secondary rod, at least one of the latter being integral with the secondary rod whose displacements with respect to the main rod are reduced relative to the displacements of the secondary piston with respect to the main rod.

4. Apparatus according to claim 2 or 3, wherein one end of the main rod by which the latter is not integrated with one of the elements, the load or support, is closed by a base against which the elastic means press and which is traversed by the secondary rod whose end external to the main rod occupies, with respect to the latter, a position which can be observed through at least one port formed in a protective jacket fixed to the cylinder by means of which the latter is integrated with the other element and which surrounds this end of the main rod.

5. Apparatus according to claim 4, wherein the valves are in the superthickness of said main rod and are disposed on either side of a channel opening on the one hand into the reservoir and on the other hand between two gaskets of said main piston themselves disposed between the flap valves.

6. Apparatus according to claim 1, 2 or 3 wherein in the superthickness of the main rod, and the flap valves are disposed on either side of a channel opening on the one hand into the reservoir and on the other between two gaskets of the main piston themselves disposed between the flap valves.

* * * * *